No. 787,266. Patented April 11, 1905.

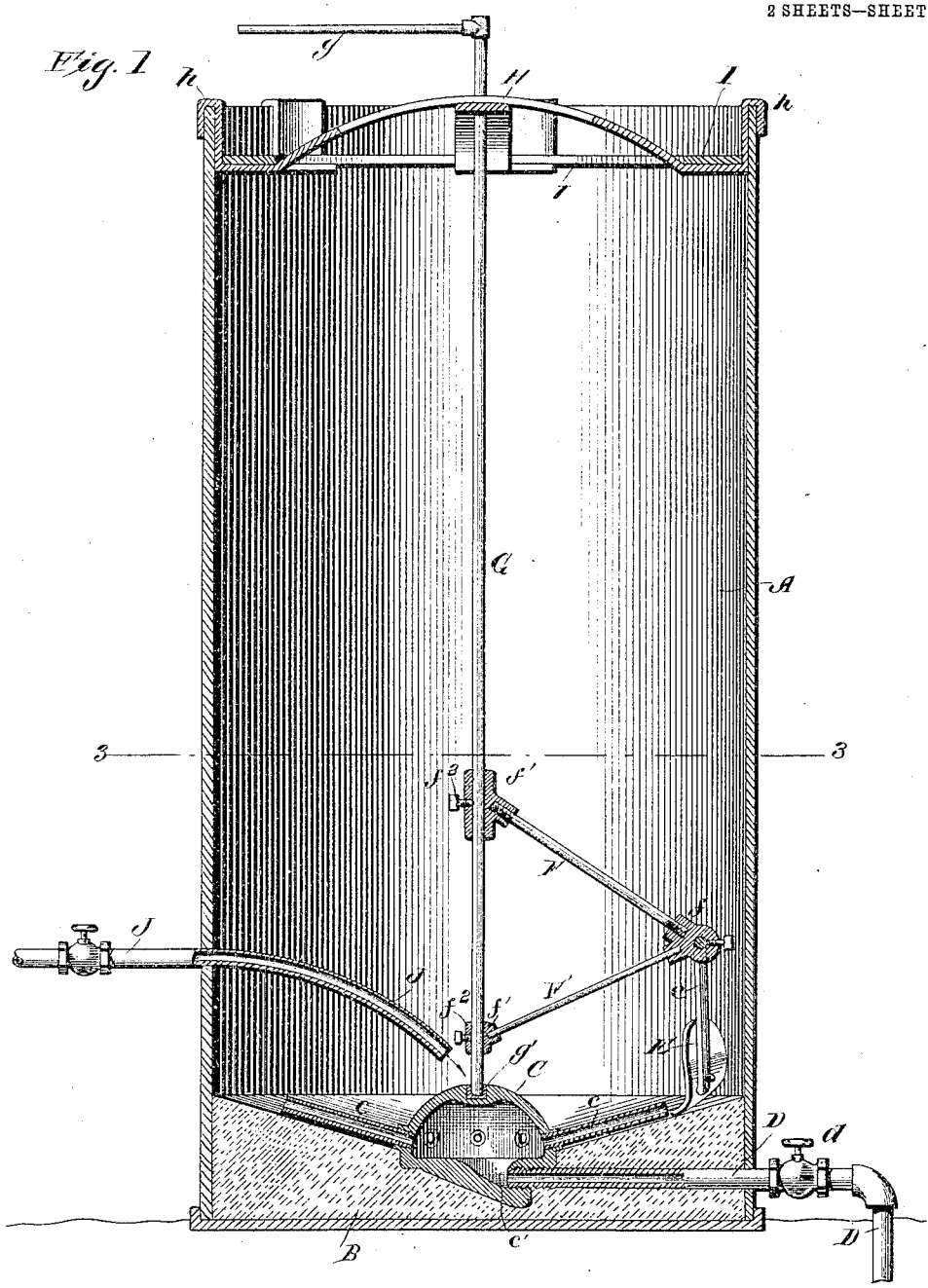

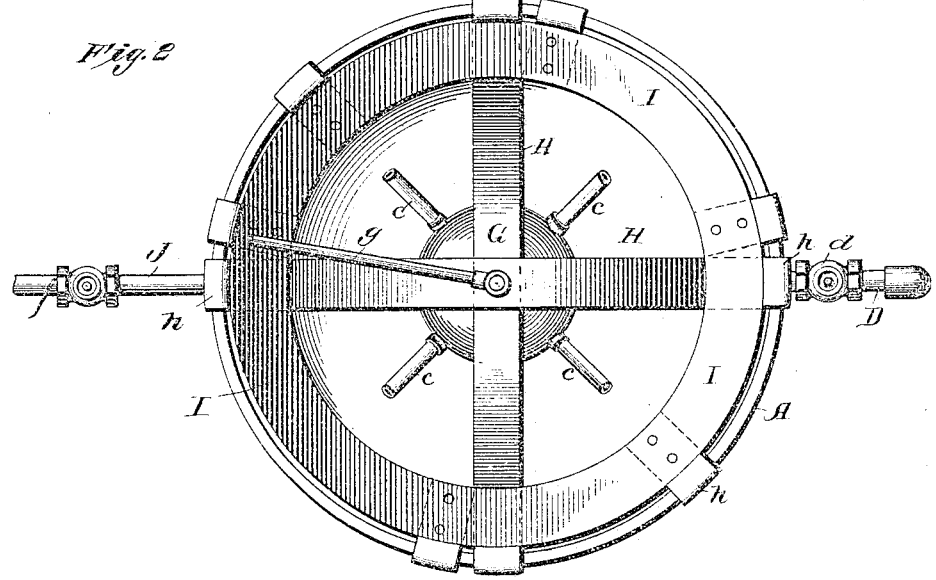
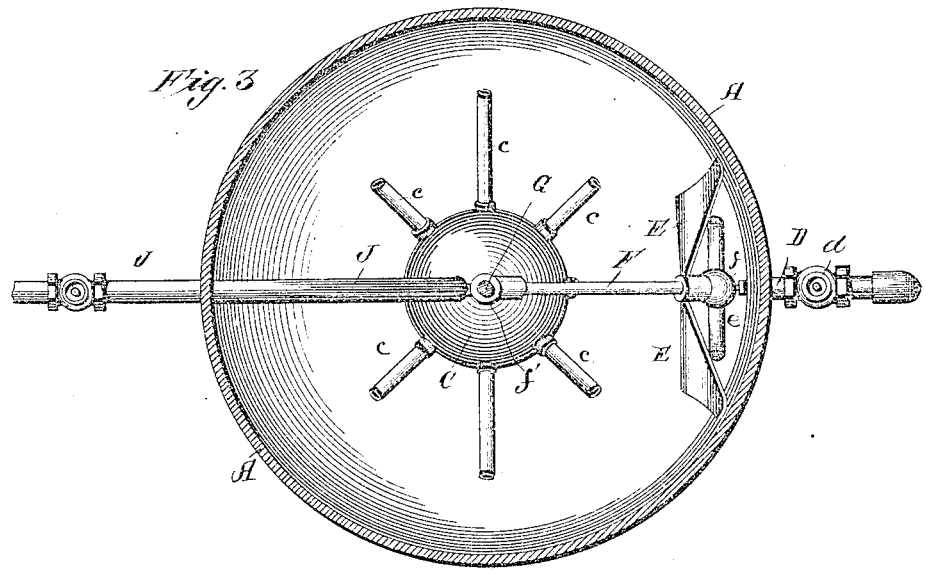
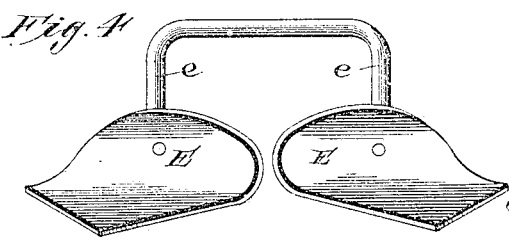

UNITED STATES PATENT OFFICE.

JAMES WILLIAM BIVINS, OF TOPEKA, KANSAS.

TANK-CLEANER.

SPECIFICATION forming part of Letters Patent No. 787,266, dated April 11, 1905.

Application filed October 25, 1904. Serial No. 229,990.

*To all whom it may concern:*

Be it known that I, JAMES WILLIAM BIVINS, a citizen of the United States, residing at Topeka, in the county of Shawnee and State of Kansas, have made certain new and useful Improvements in Tank-Cleaners, of which the following is a specification.

Water cisterns or tanks of large dimensions which are in common use for storage and supply purposes require to be cleaned more or less frequently. This operation requires that the tanks must first be emptied, and then the labor of two to five men is utilized from one to three days, after which the tanks are refilled. There is hence a quite large expense involved in labor, time, and loss of water.

I have devised and applied a simple apparatus by which tanks may be cleaned quickly and with little labor and loss of but a small quantity of water.

My invention includes improved means for effecting the mechanical loosening of the sediment and for washing out the same or discharging it from the tank, likewise an attachment for the top of a tank which serves as a support for the shaft of the rotary plow or scraper by which the sediment is loosened and also for the workman who operates such scrapers.

The invention is embodied in the construction, arrangement, and combination of parts hereinafter described and claimed, the same being illustrated in the accompanying drawings, in which—

Figure 1 is a central longitudinal section of a tank provided with my improved cleaning apparatus. Fig. 2 is a plan view of the tank and apparatus. Fig. 3 is a horizontal section on the line 3 3 of Fig. 1. Fig. 4 is a face view of the plows or scrapers constituting part of the means for mechanically loosening sediment in the tank.

A indicates the cylindrical body of a tank or cistern, and B a cement bottom therefor, the same having a concave surface. In the center of the concavity is located a hollow-crowned sediment-receiver C, from which a discharge or sludge pipe D leads out of the tank, the same being provided exteriorly with a stop-cock $d$. The receptacle C is provided with a series of inlet tubes or pipes $c$, (see Figs. 2 and 3,) the same being arranged radially and parallel to the concave bottom of the tank. The discharge-pipe D is arranged horizontal and connected with a depressed portion of the floor or bottom of the sediment-receiver C, the same constituting a pocket $c'$, in which the sediment accumulates after entering the receiver proper. This construction facilitates collection of the sediment and entrance of the same into the discharge-pipe D.

The means for mechanically loosening the sediment consists of plows or scrapers E, which are connected by rigid rods F with a central vertical rotary shaft G, the attachment being such that all the said parts rotate together. The shaft is stepped at $g'$ in a socket provided in the top of the crown of the sediment-receiver C, and its upper end has its bearings in an attachment applied to the upper end of the tank. The said attachment consists of bars H, which cross each other at right angles and whose ends are bent upward and constructed as hooks $h$, adapted to engage and rest upon the top of the tank. The portion of the bars H adjacent to the hooks is horizontal, and a circular plate I is laid thereon and serves in practice as a track upon which the workman who operates the mechanical sediment-remover may travel. The parts H and I are in practice rigidly connected, so that they constitute practically an integral device which may be easily applied and removed from the tank, as conditions require. The end of the shaft G, which projects a short distance above the attachment H I, is provided with a lateral arm $g$, which serves as a lever for rotating the shaft and the attached scrapers. As shown best in Fig. 4, the scrapers consist of metal plates curved substantially in the manner of a plow moldboard, their outer ends being adapted to work in contact with the surface of the cement bottom B. The scrapers I attach to a bar $e$, which is in turn connected with a joint-piece $f$, to which the carrying arms or braces F are secured. The said arms are in turn rigidly attached to blocks $f'$, which are applied to the shaft G and clamped thereon by screws $f^2$, so that they may be adjusted vertically as conditions require in order to enable the scrapers E to work in the required close contact with the concave cement bottom B. The several parts $e$, $f$, F, and $f'$ are detachably secured, so that the apparatus may be dismembered and shipped and transported in compact form.

Near the bottom of the tank A is arranged a water-inlet pipe J, which passes through the side of the tank and is arranged with its discharge end or nozzle in proximity to and slightly above the crown of the sediment-receiver C. This pipe is provided with a stop-cock, as shown.

My improved apparatus is operated as follows: The sediment-receiver with its rigid attachments constitute a permanent portion or attachment of the tank, it and the discharge-pipe D being laid in the cement bottom when the same is laid and formed in the cylinder. The attachment of the rotary mechanical cleaner and the parts H I may be easily effected and in an obvious manner. A workman traveling upon the circular track I and applying lateral pressure to the lever $g$ rotates the shaft, and with it the scrapers, in one direction or the other, as conditions require, whereby the sediment which has collected upon the outer portion of the concave cement bottom is loosened, as will be readily understood. The stop-cock $d$ being then opened, the great pressure of the water within the tank will drive the greater portion thereof into the inlet-pipes $c$, and thus into the receptacle C, whence it will be discharged by the pipe D. When conditions require, a stream of water is admitted by the pipe J for washing the crown or exterior of the sediment-receiver C and also for removing sediment that may accumulate between the radial inlet-pipes $c$. It is apparent that the said pipe J will prevent complete rotation of the scrapers, so that they are rotated first in one direction and then the other, so the arrangement of the two scrapers projecting in opposite directions adapts them to work over the entire surface of the tank-bottom, which is exterior to the inlet-pipe $c$. By this means sediment may be effectively removed from the tank in a very short time and with the loss of but a small portion of water.

In practice a tank sixty feet in height and thirty feet in diameter may be cleaned in from thirty to sixty minutes with the labor of one man without requiring the tank to be emptied and with the loss of but a small percentage of the water contained in it.

Having thus described my invention, what I claim as new, and desire to secure by Letters Patent, is—

1. The combination, with the tank, having a depressed bottom, of cleaning apparatus consisting of a sediment-receiver located at the lowest point in said bottom, a vertical rotary shaft stepped on said receiver, means for supporting the shaft vertically, a lateral arm secured to the shaft, and a scraper attached to and pendent from said arm and arranged to sweep over a portion of the tank-bottom intervening the side wall of the tank and said receiver, as shown and described.

2. The tank having a concave bottom, a sediment-receiver located in the center of the bottom and consisting of a chamber having a series of radial pipes extended over and parallel to the concave bottom, a discharge-pipe connected with the base of the receiver, and a scraping attachment comprising a vertical shaft stepped in said receiver, an upper bearing for the shaft which is attached to the top of the tank, and a scraper attachment comprising a lateral arm secured to the shaft and a pendent arm connected therewith and a scraper secured to said pendent arm and adapted to work on the tank-bottom exterior to the said radial pipes, substantially as described.

3. The combination, with the tank, a rotary shaft provided with a lateral lever-arm, and scrapers adapted to work on the bottom of the tank, of a shaft-support and staging comprising a central part in which the shaft is journaled, means for supporting the same upon the rim of the tank, and the circular track arranged adjacent to the tank-rim, substantially as described.

4. The combination, with the tank, of a chambered sediment-receiver having a closed top located in the center of the bottom thereof and provided with a series of lateral openings and a series of inlet-pipes extending radially, a water-inlet pipe extending through the side of the tank, its nozzle being arranged over and contiguous to the said sediment-receiver, and a lateral discharge-pipe connected with the sediment-receiver, substantially as described.

JAMES WILLIAM BIVINS.

Witnesses:
 CHARLIE R. BRATTON,
 JOHN S. WEIR.